US006652695B1

(12) United States Patent
Von Der Heide et al.

(10) Patent No.: US 6,652,695 B1
(45) Date of Patent: Nov. 25, 2003

(54) METHOD OF PRODUCING PANEL-SHAPED PRODUCTS

(75) Inventors: Kay-Henrik Von Der Heide, Darmstadt (DE); Gernot Von Haas, Leimen (DE)

(73) Assignee: Dieffenbacher Schenck Panel GmbH, Pfungstadt (DE)

( * ) Notice: Subject to any disclaimer, the term of this patent is extended or adjusted under 35 U.S.C. 154(b) by 0 days.

(21) Appl. No.: 09/914,931

(22) PCT Filed: Feb. 28, 2000

(86) PCT No.: PCT/EP00/01662

§ 371 (c)(1),
(2), (4) Date: Sep. 4, 2001

(87) PCT Pub. No.: WO00/53380

PCT Pub. Date: Sep. 14, 2000

(30) Foreign Application Priority Data

Mar. 5, 1999 (DE) ........................................ 199 09 605

(51) Int. Cl.[7] .......................... B27N 3/00; B32B 21/00; B32B 21/04

(52) U.S. Cl. .................. 156/182; 156/62.2; 156/331.4; 264/112; 264/113; 428/292.4; 428/537.1

(58) Field of Search ............................... 156/182, 62.2, 156/296, 331.4, 331.7; 264/109, 112, 113; 428/297.1, 292.4, 300.7, 532, 537.1

(56) References Cited

U.S. PATENT DOCUMENTS

| | | | | |
|---|---|---|---|---|
| 4,268,649 A | | 5/1981 | Jellinek et al. | |
| 5,779,955 A | | 7/1998 | Siempelkamp | |
| 5,932,038 A | * | 8/1999 | Bach et al. | 156/62.2 |
| 6,007,649 A | | 12/1999 | Haas et al. | |
| 6,113,729 A | * | 9/2000 | Chiu | 156/296 |
| 6,197,414 B1 | * | 3/2001 | Kawai et al. | 428/297.4 |

FOREIGN PATENT DOCUMENTS

| | | |
|---|---|---|
| AT | 270189 | 4/1969 |
| DE | 7717108 | 1/1978 |
| DE | 2716971 | 10/1978 |
| DE | 2832509 | 1/1980 |
| DE | 3730776 | 3/1989 |
| DE | G9209289 | 10/1992 |
| EP | 0877767 | 8/1977 |
| EP | 0346864 | 12/1989 |
| GB | 1148016 | 4/1969 |

OTHER PUBLICATIONS

Derwent Abstract of DE 3730776.*

E. Schriever, "Diisocyanat– und Polyurethanklebstoffe für Holz und Holzwerkstoffe"; Fraunhofer–Institut für Holzforschung, Wilhelm—Klauditz—Institut; Mar., 1982, WKI–Bericht Nr.14, pp. 4 to 17.

G. Loew, "Isocyanate as a binder for particle board"; Engineer H. I. Sachs of Bayer AG, 1977, pp. 473–492.

* cited by examiner

*Primary Examiner*—Richard Crispino
*Assistant Examiner*—Sue A. Purvis
(74) *Attorney, Agent, or Firm*—W.F. Fasse; W.G. Fasse

(57) ABSTRACT

In a method of producing panel-shaped products by hot pressing a formed multi-layered body of lignocellulose-containing chips impregnated with binder, different binders are used in the middle layer and in the cover layers arranged on both sides of the middle layer, the cover layers consist of chips of wood or other raw materials based on wood impregnated with a binder including amino and/or phenolic plastics, and the middle layer consists of a mixture of chips of lignocellulose-containing annual plants chips of wood or other raw materials based on wood impregnated with a binder including an isocyanate.

15 Claims, 1 Drawing Sheet

METHOD OF PRODUCING PANEL-SHAPED PRODUCTS

FIELD OF THE INVENTION

The invention relates to a method of producing clipboard or particle board Panels using wood materials and using annual plant materials containing lignocellulose.

BACKGROUND OF THE INVENTION

In the production of multi-layered plates or panels of lignocellulose-containing materials, it is known to use isocyanate as a binder. The use of isocyanate as a binder for panel products as well as the advantages and disadvantages resulting therefrom are described in the special publication "Isocyanate as a binder for particle board" by Dr. G. Loew, Engineer H. I. Sachs of Bayer AG, from 1977, on page 479. From this it is evident that polyisocyanates adhere onto metals under pressure and heat. As a solution possibility to these problems, the use of liquid separating agents as well as the use of papers, veneers, as well as dust or conventionally adhesive bonded or glued chip cover layers is suggested.

A method for the production of multi-layered panel materials of is a mass of wood chips, wood fibers, or of lignified raw materials, impregnated with isocyanate, is known from the Austrian Patent 270,189. Furthermore it is known from this publication, to use a mixture of isocyanate as well as urea-, melamine-, and phenol formaldehyde resin glue or adhesive as a binder, or for example, to bind the chips in the cover layer with melamine resin and the chips of the middle layer with pure isocyanate solution, or vice versa. By the use of a mixture of the above named binders, a strongly increased moisture resistance and a considerable reduction of the swelling of the panel products upon the penetration of moisture are achieved.

From the U. S. Pat. No. 5,779,955, a method for the production of panel materials is known, in which particles of plant-related products are mixed with isocyanate as a binder as well as water, as the panel material. In order to avoid the problems of the adhering of the mats during the pressing, which problems arise with the use of isocyanate as a binder, the underlayer is covered with a liquid separating agent before the spreading of the mixture. After the spreading process, a separating agent is similarly applied onto the top surface of the laid-down mixture. Thereafter, the hot pressing of the formed body is carried out.

SUMMARY OF THE INVENTION

Object of the present invention is to provide a method for the production of multi-layered panel-shaped products, which is utilizable dependent on the availability of raw materials, and the problems arising in the state of the art in connection with isocyanate glued chips are avoided. This object is achieved according to the invention in a method for producing a pressed panel of chips or particles, comprising the following steps:

a) providing a cover layer material comprising chips of wood or a wood-based material;

b) providing a first middle layer material comprising chips of wood or a wood-based material;

c) providing a second middle layer material comprising chips of a non-wood material of annual plants containing lignocellulose;

d) mixing together the first middle layer material and the second middle layer material to form thereof a mixed middle layer material;

e) before or after the step d), applying a first middle layer binder to the first middle layer material and applying a second middle layer binder comprising an isocyanate to the second middle layer material;

f) applying to the cover layer material a cover layer binder that is different from the second middle layer binder and that comprises at least one of an amino polymer resin and a phenolic polymer resin;

g) after the steps e) and f), depositing in sequence a lower layer of the cover layer material having the cover layer binder applied thereon, a middle layer of the mixed middle layer material having the first middle layer binder and the second middle layer binder applied thereon, and an upper layer of the cover layer material having the cover layer binder applied thereon, to form thereof a multi-layered mat body; and h) pressing the multi-layered mat body to form thereof the pressed chip panel.

The above method according to the invention thus results in a pressed chip panel including a middle layer that comprises a mixture of wood chips and chins of annual plants containing lignocellulose glued with a binder including an isocyanate, and upper and lower cover layers that comprise wood chips glued with a binder including amino and/or Phenolic Polymer.

With the present invention, it becomes possible to produce a panel-shaped product, which consists of a different raw material composition and binder agents or binders in the middle layer and the cover layers. By means of this panel-shaped product, which is referred to as a mixed panel in the following, it is possible for producers, which especially produce chip panels of wood chips, to use the available raw material of annual plants as additional raw material. In a conventionally operating plant for the production of chip panels from wood chips, the existing material preparation can be re-equipped or expanded by an additional straw preparation line. A preparation plant to be set up in such a manner essentially consists of a one- or multi-stage crushing or comminution process, dryer, sifter or sorter, sieve station, as well as a gluing or adhesive applying plant suitable for straw. Depending on the availability of the raw material of annual plants, the proportion of the raw material of annual plants in relation to the raw material wood can be varied in the middle layer. The cover layers of the panel-shaped product according to the invention consist of wood chips, that are glued with amino and/or phenolic plastics. Thereby the problems of the adhesion of isocyanate glued chips onto the plate surfaces during the pressing are avoided. In the inventive method, no additional separating agents or separating layers are necessary, so that additional costs are avoided.

The mixed panel according to the invention with phenolic and/or amino plastic glued wood chips in the cover layers as well as with isocyanate glued straw or straw-wood mixtures in the middle layer comprises a sufficient cold adhesiveness of the spread formed body as well as a good edge stability. Hereby the production process is considerably simplified. By means of this sufficient cold adhesiveness, which is not achieved by pure isocyanate glued straw or wood chips, a stable multi-layered formed body is achieved, which, due to the existing cold adhesiveness, may be more effectively pre-compressed as well as being transportable over the individual transfer areas in the forming or extrusion line to the press inlet without damage of the previously achieved cover layer quality.

In a further development of the idea of the invention it is provided that the middle layer material wood is glued with amino and/or phenolic resins, and the middle layer material of lignocellulose-containing annual plants is glued with isocyanate or mixtures of isocyanate and amino/phenolic resins. A reducing proportion of isocyanate as binder leads to a cost reduction.

BRIEF DESCRIPTION OF THE DRAWING

The method according to the invention will be described in detail in connection with an example embodiment, which is shown in the single accompanying drawing FIGURE, which schematically illustrates the method for the production of a three layered chip panel.

DETAILED DESCRIPTION OF A PREFERRED EXAMPLE EMBODIMENT OF THE INVENTION

Figure 1:
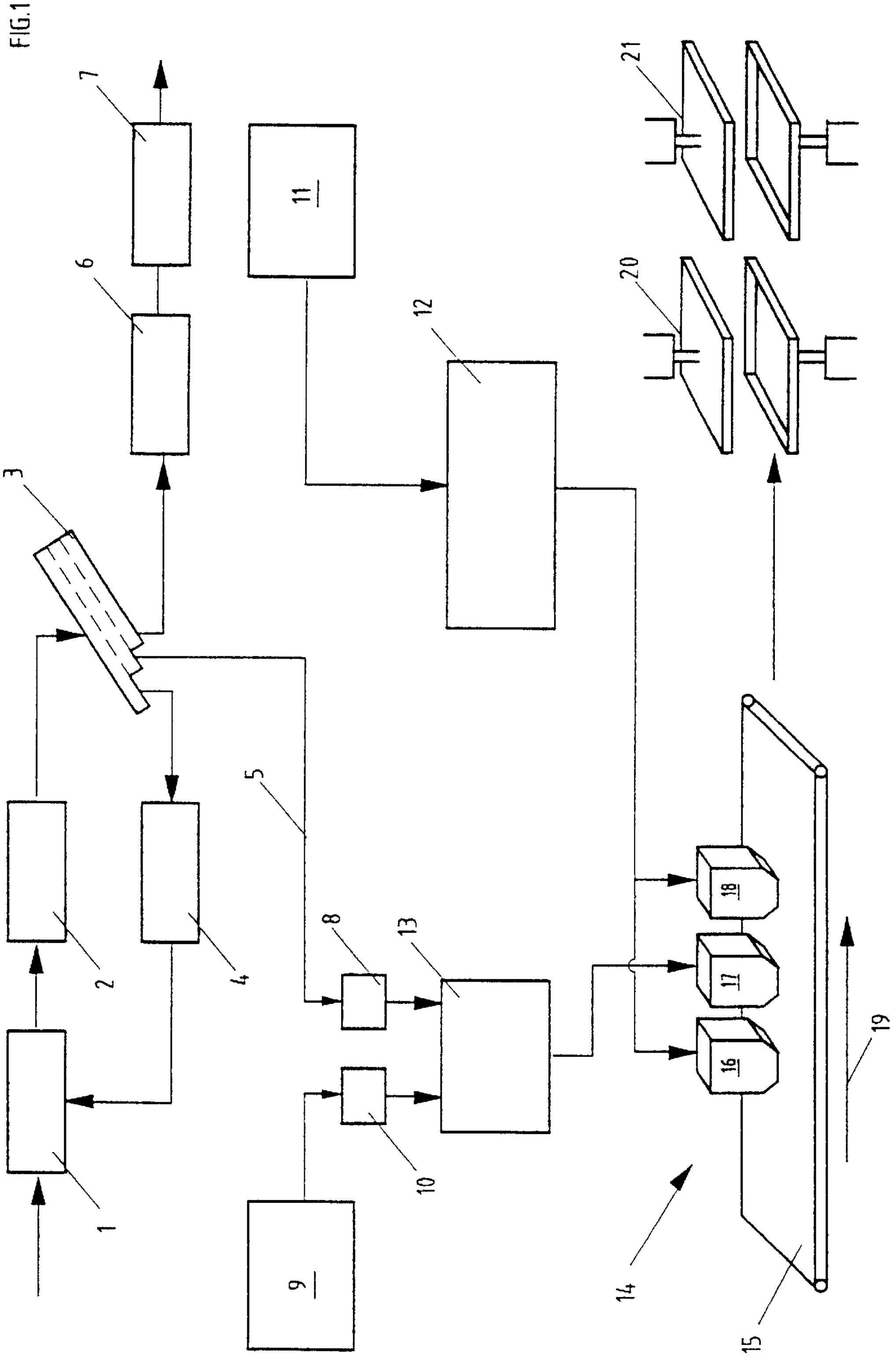

In the method according to the invention for the production of a three layered chip panel, first the preparation of the raw material is carried out. Lignocellulose-containing annual plants as well as wood or other raw materials based on wood are used as raw material.

For example, grain straw, rice straw, hemp, soybean straw, belong among lignocellulose-containing annual plants. In the following description of the method for the production of a three layered chip panel, grain straw and wood, which are prepared independently from one another, are used as raw materials.

The grain straw is first prepared in a multi-stage size-reducing or comminution process 1. The comminuted grain straw is next dried in a dryer 2 to a final moisture of approx. 2 to 5%. In a sieve station 3 following thereupon, the dried grain straw is separated into the fractions coarse goods 4, middle layer material 5, and dust 6. The coarse goods are delivered back into the comminution process, the dust 6 is delivered to a burning or combustion system 7. The middle layer material CL grain straw 5 is delivered to a first gluing station 8. Independent of the preparation of the grain straw, simultaneously the raw material wood is prepared. The previously comminuted wood chips are similarly dried in a dryer and next separated into fractions in a sieve station. The preparation of the raw material wood is not shown in the schematic illustration according to FIG. 1, because it is known. The fraction middle layer material CL wood 9 is next delivered to a second gluing station 10. In a further embodiment of the inventive idea, the middle layer material CL grain straw as well as the middle layer material CL wood could also be delivered to a common gluing station.

In the first gluing station 8, the middle layer material CL grain straw 5 is glued with binder. Preferably isocyanate is used as a binder. In the first gluing station 8, water or other additives may be added in addition to the binder. The possibility also exists to add isocyanate in emulsified form to the gluing station. In the second gluing station 10, the middle layer material CL wood 9 is glued with binder. Preferably isocyanate is used as a binder. In the second gluing station 10, similarly, water or other additives can be added in addition to the binder. The possibility also exists, to add isocyanate in liquid form or emulsified to the gluing station. In the first and second gluing station 8, 10 different binders could also be used. For example the middle layer material wood in the second gluing station 10 could be glued with emulsified isocyanate and the middle layer material grain straw could be glued with non-emulsified isocyanate.

In a further embodiment variant it can be provided that in the first gluing station 8, the middle layer material grain straw is glued with isocyanate, and in the second gluing station 10, the middle layer material wood is glued with amino and/or phenolic plastics.

Moreover it could be provided in an advantageous embodiment, that in the first gluing station 8, the middle layer material grain straw is glued with 1 to 3% isocyanate and approximately 1 to 3% phenol and the middle layer material wood is glued with amino and/or phenolic plastics. The use of pulverized phenolic resins in the form of novolak is also conceivable.

The cover layer material SL wood 11 acquired in the wood preparation is delivered to a third gluing station 12 and glued with amino plastics as a binder. Instead of amino plastics, phenolic plastics or mixtures thereof could also be used. After the middle layer material CL grain straw 5, as well as CL wood 9, as well as the cover layer material SL wood 11 are glued with the above described binders in the gluing stations 8, 10, 12, the glued fractions CL wood 9 and CL grain straw 5 are guided or delivered together and homogenized through a mixing device 13. Preferably, the mixing device 13 is arranged directly before or in front of the forming station 14. The homogenized middle layer material CL grain straw/CL wood 5/9 as well as the cover layer material SL wood 11 is delivered to a forming station 14. In the production method according to the invention according to the schematic illustration of FIG. 1, the forming station consists of three spreading units 16, 17, 18 arranged one after another in the transport direction of the forming band or belt 15. The transport direction is indicated by the arrow 19. The glued cover layer material SL wood 11 is delivered to the first spreading unit 16, and is spread as a first layer onto the forming band or belt 15. The second spreading unit 17 following thereupon has delivered thereto the glued middle layer material CL wood/CL grain straw 5/9, which is spread onto the first layer. Glued cover layer material SL wood 11 is similarly delivered to the third spreading unit 18, and is spread as a third layer onto the second layer. In this manner, a three layered formed body is continuously spread onto the forming band or belt 15, whereby the outer cover layers consist of wood chips glued with amino and/or phenolic plastics, and the middle layer consists of wood chips and grain straw chips glued with isocyanate. The spread-out three layered formed body is next delivered to a continuous pre-press 20, which achieves a pre-pressing or pre-compression of the formed body. After the pre-pressing, the formed body is hot pressed in a further press 21. The further press 21 can be embodied as a continuous press or a cycling press.

As an alternative to the previously described method according to the invention according to FIG. 1, the possibility also exists to use only grain straw as middle layer material. This is sensible for a sufficient availability of grain straw, because then the additional homogenization in the mixing device 13 can be omitted in the production method. In this alternative, a three layered formed body is spread onto the forming band, whereby the outer cover layers consist of wood chips glued with amino and/or phenolic plastics, and the middle layer consists of grain straw chips glued with isocyanate.

What is claimed is:

1. A method of producing a pressed chip panel, comprising the following steps:

a) providing a cover layer material comprising chips of wood or a wood-based material;

b) providing a first middle layer material comprising chips of wood or a wood-based material;

c) providing a second middle layer material comprising chips of a non-wood material of annual plants containing lignocellulose;

d) mixing together said first middle layer material and said second middle layer material to form thereof a mixed middle layer material;

e) before or after said step d), applying a first middle layer binder to said first middle layer material and applying a second middle layer binder comprising an isocyanate to said second middle layer material;

f) applying to said cover layer material a cover layer binder that is different from said second middle layer binder and that comprises at least one of an amino polymer resin and a phenolic polymer resin;

g) after said steps e) and f), depositing in sequence a lower layer of said cover layer material having said cover layer binder applied thereon, a middle layer of said mixed middle layer material having said first middle layer binder and said second middle layer binder applied thereon, and an upper layer of said cover layer material having said cover layer binder applied thereon, to form thereof a multi-layered mat body; and h) pressing said multi-layered mat body to form thereof said pressed chip panel.

2. The method according to claim 1, wherein said cover layer material consists of said chips of wood or a wood-based material, said first middle layer material consists of said chips of wood or a wood-based material, and said second middle layer material consists of said chips of non-wood material of annual plants containing lignocellulose.

3. The method according to claim 1, wherein said step e) is performed before said step d), and said first middle layer binder is a different binder material than said second middle layer binder.

4. The method according to claim 3, wherein said first middle layer binder is an emulsified isocyanate, and wherein said isocyanate of said second middle layer binder is a non-emulsified isocyanate.

5. The method according to claim 3, wherein said first middle layer binder comprises at least one of an amino polymer resin and a phenolic polymer resin, and said second middle layer binder consists of said isocyanate.

6. The method according to claim 3, wherein said first middle layer binder consists of at least one of an amino polymer resin and a phenolic polymer resin, and said second middle layer binder further comprises at least one of an amino polymer resin and a phenolic polymer resin mixed with said isocyanate.

7. The method according to claim 3, wherein said applying of said first middle layer binder to said first middle layer material is carried out in a first gluing station, and said applying of said second middle layer binder is carried out in a second gluing station that is separate and distinct from said first gluing station.

8. The method according to claim 1, wherein said second middle layer binder consists of said isocyanate.

9. The method according to claim 8, wherein said first middle layer binder also consists of said isocyanate.

10. The method according to claim 8, wherein said cover layer binder consists of said at least one of said amino polymer resin and said phenolic polymer resin.

11. The method according to claim 1, wherein said step d) comprises mixing together from more than 0% to not more than 70% of said first middle layer material, and from 30% to less than 100% of said second middle layer material, to form thereof said mixed middle layer material.

12. The method according to claim 1, wherein said mixed middle layer material makes-up the majority and up to 70% of said pressed chip panel.

13. The method according to claim 1, wherein said pressing in said step h) comprises a pre-pressing step followed by a separate hot pressing step.

14. The method according to claim 1, wherein said steps a) and c) respectively comprise preparing said chips of wood or a wood-based material and preparing said chips of a non-wood material separately and independently from each other.

15. The method according to claim 1, wherein said non-wood material consists of grain straw.

* * * * *